United States Patent
Steinlechner et al.

(10) Patent No.: US 7,064,316 B2
(45) Date of Patent: Jun. 20, 2006

(54) CODE (RING) WITH TWO PAIRS OF PERIODIC LINE PATTERNS

(75) Inventors: Siegbert Steinlechner, Leonberg (DE); Axel Wenzler, Leonberg (DE); Klaus Marx, Stuttgart (DE); Franz Jost, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 277 days.

(21) Appl. No.: 10/433,550

(22) PCT Filed: Jun. 19, 2002

(86) PCT No.: PCT/DE02/02238

§ 371 (c)(1),
(2), (4) Date: Jun. 4, 2003

(87) PCT Pub. No.: WO03/019117

PCT Pub. Date: Mar. 6, 2003

(65) Prior Publication Data

US 2004/0056184 A1    Mar. 25, 2004

(30) Foreign Application Priority Data

Aug. 18, 2001 (DE) .............................. 101 40 616

(51) Int. Cl.
*G01D 5/34* (2006.01)

(52) U.S. Cl. .............................. 250/231.18; 250/231.14

(58) Field of Classification Search ........... 250/231.14, 250/231.16, 231.18; 73/862.324; 180/443, 180/444, 446; 356/138
See application file for complete search history.

(56) References Cited

U.S. PATENT DOCUMENTS

| | | | |
|---|---|---|---|
| 5,237,391 A | | 8/1993 | Boeing |
| 5,841,132 A | * | 11/1998 | Horton et al. .......... 250/231.13 |
| 5,930,905 A | | 8/1999 | Zabler et al. |
| 6,528,783 B1 | * | 3/2003 | Mortara et al. ......... 250/231.13 |
| 6,545,262 B1 | * | 4/2003 | Burgschat .............. 250/231.18 |
| 6,679,126 B1 | * | 1/2004 | Dalton et al. .......... 73/862.324 |
| 6,817,528 B1 | * | 11/2004 | Chen ..................... 235/462.13 |

FOREIGN PATENT DOCUMENTS

| | | |
|---|---|---|
| DE | 42 25 319 | 2/1994 |
| DE | 195 06 938 A1 | 8/1996 |
| DE | 198 55 064 | 5/2000 |
| DE | 100 42 656 | 8/2000 |
| EP | 1 043 571 | 10/2000 |

* cited by examiner

*Primary Examiner*—David Porta
*Assistant Examiner*—Davienne Monbleau
(74) *Attorney, Agent, or Firm*—Michael J. Striker

(57) ABSTRACT

A method for optical measuring data acquisition of a component that moves in a rotary or translatory manner, in particular for optical angle, torque, or distance measurement, includes generation of a first pair of periodic line patterns extending in the movement direction of the component and a second pair of periodic line patterns extending in the movement direction of the component, which each have m periods, in particular n+1 periods, over the movement range of the moving component determination of respective phases of the line patterns of the first pair and of the second pair, determination of the phase position of the first pair of line patterns on the basis of the phases and of the second pair of line patterns on the basis of the phases, and determination of the position of the component on the basis of the phase positions.

11 Claims, 3 Drawing Sheets

CODE (RING) WITH TWO PAIRS OF PERIODIC LINE PATTERNS

BACKGROUND OF THE INVENTION

The current invention relates to a method and a device for optical measuring data acquisition, in particular for optical angle, torque, or distance measurement.

SUMMARY OF THE INVENTION

Various optical methods for angle measurement have been disclosed, which are as a rule digital methods, which have advantages over analog measuring methods with regard to contamination and tolerance problems.

There is a distinction between incrementally and absolutely measuring methods. Typically, absolute measuring methods use optical codes, for example the Cray code or the Manchester code.

For certain uses, for example so-called electronic power steering (EPS), in addition to the angular data regarding an axle, it is also desirable to know what torque is being applied to it. Since a torque measurement can be projected onto an angular measurement in a relatively simple manner with the aid of a torsion segment, enhanced methods are currently being developed, which can determine the angle and in addition or alternatively, the torque of an axle by means of an angle measurement. A common element of the known methods is that they measure the angle very precisely before and after the torsion segment in order to then infer the torque to be measured from a relatively slight angular difference.

DE-P 10042656 has disclosed a method for determining a rotation angle and/or an angular difference from phase signals. The method is executed using a divided shaft with phase tracks and an interposed torsion segment, wherein associated sensors and an evaluation unit are used to obtain respectively multi-valued phase signals with reference to a rotation of the shaft. According to this method, at least two phase signals are first added up in a weighted fashion to produce a signal, and then based on the signal, a nonintegral component is generated, which is proportional to the angular difference. Based on the angular difference, the torque engaging the shaft can be determined through multiplication by the spring rate of the interposed torsion segment.

Accordingly, one object of the current invention is to achieve, in the simplest manner possible, an absolute measuring data acquisition, in particular an angle measurement of an axle, for example a steering axle, with the additional optional possibility of determining a torque acting on the axle. Another object of the current invention is to execute a distance measurement in the simplest manner possible.

In keeping with these objects and with others which will become apparent hereinafter, one feature of the present invention resides, briefly stated, in a method for optical measuring data acquisition of a component that moves in a rotary or translatory manner, comprising the steps generation of a first pair of periodic line patterns (2a, 2b) extending in the movement direction of the component and each having n periods over the movement range of the moving component, wherein the line patterns are disposed in a fixed phase relationship to one another in the movement direction of the component (2a, 2b), generation of a second pair periodic line patterns (2c, 2d) extending in the movement direction of the component, which each have m periods, in particular n+1 periods, over the movement range of the moving component, wherein the line patterns are disposed in a fixed phase relationship to one another in the movement direction of the component (2c, 2d), determination of respective periodicities and phases (P1, P2; F1, F2) of the line patterns of the first pair (2a, 2b), determination of respective periodic ties and phases (P3, P4; F3, F4) of the line patterns of the second pair (2c, 2d) in relation to a reference value perpendicular to the movement direction of the component, determination of the phase position (PH1) of the first pair of line patterns (2a, 2b) on the basis of the periodicities and phases (P1, P2; F1, F2), determination of the phase Dosition (PH2) of the second pair of line patterns on the basis of the periodicities and phases (P3, P4; F3, F4), and determination of the position of the component on the basis of the phase positions (PH1, PH2).

Another feature of the present invention resides in a device for optical measuring data acquisition of a component (4) that moves in a rotary or translatory manner—in accordance with the method according to claim 10, with a code track (2) that is applicable to the moving component and includes at least two pairs of periodic line patterns (2a, 2b, 2c, 2d), a sensor (1) for optical detection of the line patterns, and a computing unit (5) for calculating a position of the component (4) on the basis of the line patterns detected by the sensor (1) and for calculating periodicities and phases derived from these line patterns.

In comparison to the conventional methods, the method according to the invention, due to the varying, regular, periodic line patterns, turns out to be significantly more tolerant of contamination and other adverse influences. The risk of incorrect interpretations, for example due to contamination of the respective line patterns, is sharply reduced according to the invention. In addition to a reduced sensitivity to contamination, (for example sensitivity to water or particles), in comparison to conventional methods, light intensity drift in illumination sources over their service life as well as distance and position dependencies of the optical sensor can be easily compensated for. It also turns out to be advantageous that the method proposed by the invention has a relatively low degree of redundancy.

The device according to the invention excels in that it can execute the method according to the invention in a particularly simple manner.

According to a preferred embodiment of the method according to the invention, the pairs of line patterns each include at least one sine curve and one cosine curve, i.e. curves that are phase-shifted in relation to one another by 90°. Periodic curves of this kind turn out to be particularly easy to interrelate and to computationally process. It is advantageous here to use a family of sine and cosine curves with the same period length and different amplitudes. By providing regular distances between the amplitudes of a number of sine curves and cosine curves, it is possible to assure that the individual sine curves are always spaced the same distances apart from one another in a span direction perpendicular to the main span direction.

The angles or phase positions of the respective pairs of line patterns (in the movement direction of the component) are suitably determined through arc tangent calculation of the quotient of the phases or periodicities of the respective line patterns (in a direction perpendicular to the movement direction of the component). This yields the following relations:

$PH1 = \arctan(P1/P2)$ or $\arctan(F1/F2)$ and $PH2 = \arctan(P3/P4)$ or $\arctan(F3/F4)$, where PH1, PH2 indicate the angles and/or phase positions of the line patterns and P1 to P4 or F1 to F4 indicate the periodicities.

The torque to be determined is preferably determined through the use of the vernier principle, based on the phase positions PH1, PH2 that have been established by means of the above relations.

According to a particularly preferable embodiment of the method according to the invention, the phase positions of the respective line patterns perpendicular to the rotation direction of the shaft are determined through periodically changing distances between individual lines of the respective line patterns. Providing a number of lines in a line pattern makes it possible to effectively prevent imprecisions that arise, for example, due to contamination.

It turns out to be very advantageous here if the adjacent lines of the individual line patterns are always spaced the same distances apart from each other on an (imaginary) intersecting line perpendicular to the rotation direction of the shaft. This simplifies the computational evaluation for obtaining the phases or phase positions P1 to P4, for example by means of a pattern comparison or a Fourier analysis. It should be noted that the phases and periodicities here are defined by the concrete distances of the lines from one another.

According to another preferred embodiment of the method according to the invention, the phases of the iine patterns perpendicular to the rotation direction of the shaft are determined through changing distances of the lines of the line patterns from a real or imaginary reference line extending parallel to the rotation direction. This method makes it possible to supply line patterns with constant distances of the individual lines perpendicular to the rotation direction of the shaft. The electronic or computational determination of the phase position of such patterns with known period lengths can be executed in a simple and inexpensive manner. The phases here are defined by the distance of the respective lines from the reference line.

The invention will now be described in detail in conjunction with the accompanying drawings.

DESCRIPTION OF THE PREFERRED EMBODIMENTS

Figure 1:
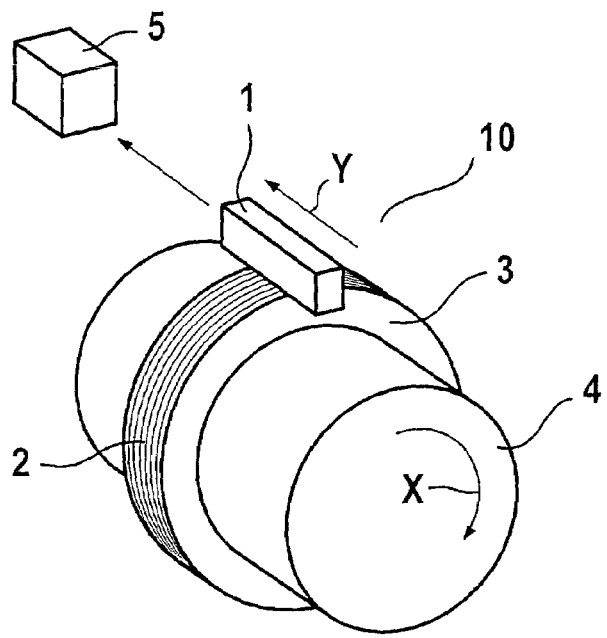
FIG. 1 shows a perspective (schematically simplified) view of a first preferred embodiment of the device according to the invention, in particular for executing the method according to the invention.

FIG. 1 shows a preferred embodiment of the device according to the invention, which is labeled as a whole with the reference numeral 10. The device has a code ring 3 disposed on a shaft or axle whose angular position is to be determined. A code track 2 is applied to the code ring 3, for example by means of a laser process. The rotation direction of the code track 2, which corresponds to the rotation direction of the shaft 4, is indicated by the arrow X. The code ring 3 is affixed to the shaft 4 whose rotation angle Phi is to be precisely determined.

The device also has a sensor that is oriented perpendicular to the movement direction of the code track 2 and is fixed against relative rotation in relation to the shaft 4 and the code track 2, which sensor will be referred to below as a CCD line 1. The data acquired from the code track 2 by the CCD line 1 are supplied for further processing to a (schematically depicted) computer 5.

Figure 2:
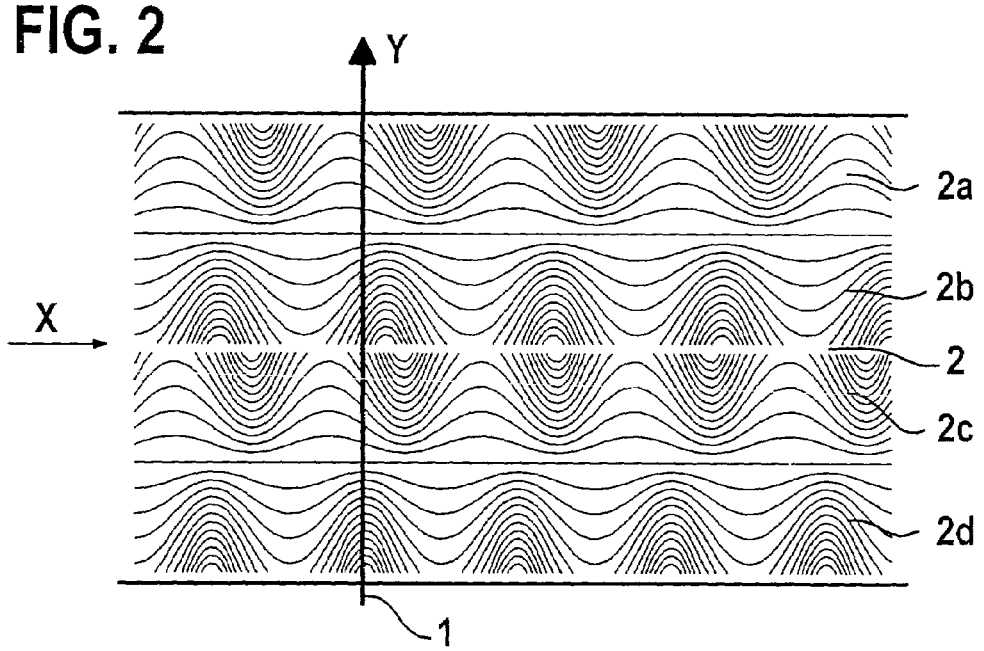
FIG. 2 shows a projected view of a first preferred code track for the code ring according to FIG. 1, which can be used to produce a first preferred embodiment of the method according to the invention.

As can be seen in FIG. 2, the code track is subdivided into four segments 2a, 2b, 2c, and 2d, which each have closed, periodic patterns, for example analog sine and cosine curves. In this instance, the segments 2a, 2b constitute a first line pattern pair and the segments 2c, 2d constitute a second line pattern pair. The periodicities of the line pattern pairs are designed so that the segments 2a and 2b have n periods over the circumference of the code track (rotation direction X over 360°) and the segments 2c and 2d by contrast have n+1 periods. The patterns each have a number of lines, with the particular feature that the distances between the lines along the scan line of the CCD line 1 (or any imaginary intersecting line perpendicular to the movement direction X) are constant. This pattern can be easily produced by means of superposed sine and cosine tracks that differ in amplitude, as shown for example in FIG. 2.

Figure 3:
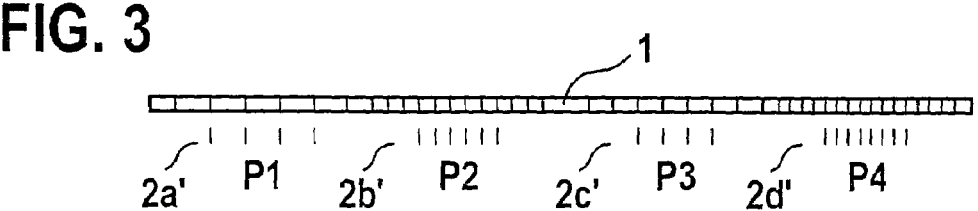
FIG. 3 is a diagram for depicting the phases and periodicities obtained with a code track according to FIG. 2, perpendicular to the movement direction of the code track.

In each angular position of the shaft 4, the CCD line 1 detects four regular, equidistant line patterns 2a', 2b', 2c', and 2d'. These line patterns are depicted in FIG. 3 and in a manner of speaking, represent snapshots of the code tracks. The periodicity of these line patterns can be determined in a set of evaluation electronics (computer 5). Such an evaluation yields the periodicity lengths or phases P1 to P4 perpendicular to the rotation direction x of the shaft 4, which are associated with the respective snapshots of the line patterns 2a' to 2d'. These periodicity lengths or phases P1 to P4 along the scan line are then used as input values for the absolute angle determination. The periodicity lengths can clearly also be indicated as distances between adjacent lines of a line pattern.

Based on the phases P1 and P2 the angle or the phase position of the first sine and cosine pair (of the first line pattern pair 2a, 2b) is determined through a simple arc tangent calculation of the quotient of P1 and P2 and the phase position of the second line pattern pair is correspondingly determined based on the phases P3 and P4. This yields the two phase values:

$PH1 = \arctan(P1/P2)$ and $PH2 = \arctan(P3/P4)$.

These two values in the range from 0 to $2\pi$ are then converted, with the aid of the vernier principle, for example the modified vernier principle described in DE 195 06 938 A1, into an unambiguous absolute position angle Phi of the code ring on the circumference of the code ring 3 or the shaft 4. It should be noted that an unambiguity that is initially present over an angle range of 180° can be extended to an angle range of 360° through a sign analysis of the values P1 to P4.

In order to determine the position angle Phi of the shaft 4, first a working value k is calculated based on the two phase values PH1 and PH2 according to the equation:

$$k = \frac{(n+1) \cdot PH1 - n \cdot PH2}{360}.$$

As a rule, this value is not integral, which is due to measurement errors in PH1 and PH2. Because of the mathematical relationship between PH1 and PH2, however, it is necessary for the working value k to be integral and thus in the current case, it turns out to be suitable to use the closest integer to k for the remaining calculation. For the sake of simplicity, this closest integer will also be referred to below as k. The rotation angle of the shaft 4 is now calculated according to the following equation:

$$Phi = \frac{(n+1) \cdot PH1 + n \cdot PH2 - (2n+1) \cdot k \cdot 360}{2n \cdot (n+1)}.$$

This relation clearly demonstrates the error reduction achieved by means of the method depicted. An error in PH1 or PH2 is only transmitted to the desired angle Phi at a ratio of approximately 1/n.

The divergence of the real number k from the closest integer, in this case also referred to as k, can be used as a measure for the reliability of the determined measurement value Phi.

Using the method according to the invention, the device 10 shown can to a large extent automatically correct imprecisions caused by tolerance-encumbered installation positions of the CCD line 1. An offset of the CCD line 1 in the longitudinal direction (indicated by the arrow Y in FIG. 1) has no effect since only periodicities of regular patterns are determined. A height deviation, i. e. the distance of the code ring 3 from the CCD line 1, which is expressed in an increase or decrease of the periodicities, is eliminated by means of the quotient calculation. Even inclined positions of the CCD line 1 can be corrected within certain limits, on the one hand through averaging (in this case, the distances of the individual lines of the line pattern are no longer completely constant), and on the other hand, through the arc tangent calculation.

A broadening of the method depicted to include torque measurement can be achieved in a known manner by means of a second code ring, which can rotate in a torque-dependent manner by means of a torsion segment. The achievable precisions of the respective measured angles permit a torque detection that is precise enough for numerous applications.

It should be noted that it is also easily possible to carry out a linear distance measurement using the method depicted. For example, the pattern depicted in FIG. 2 can be printed on paper and glued onto a segment to be measured. The measurement is then executed with the aid of the same or similar optics and evaluation.

Another preferred embodiment of the method according to the invention will now be explained in conjunction with FIGS. 4 and 5. In the first preferred embodiment of the method according to the invention explained above, local angle data were determined based on location-dependent phases and these angle data were then converted into an overall angle with the aid of a vernier method. Since a certain hardware and software expense is required in order to execute the optical and/or electronic detection of different or changing periodicities (for example through the execution of Fourier transformations), in the second embodiment of the method according to the invention that will now be explained, the local angle data are obtained from line patterns that shift in relation to one another and have a constant periodicity. The electronic determination of the phases of patterns of this kind with known period lengths can be achieved in a very simple and inexpensive manner.

Figure 4:
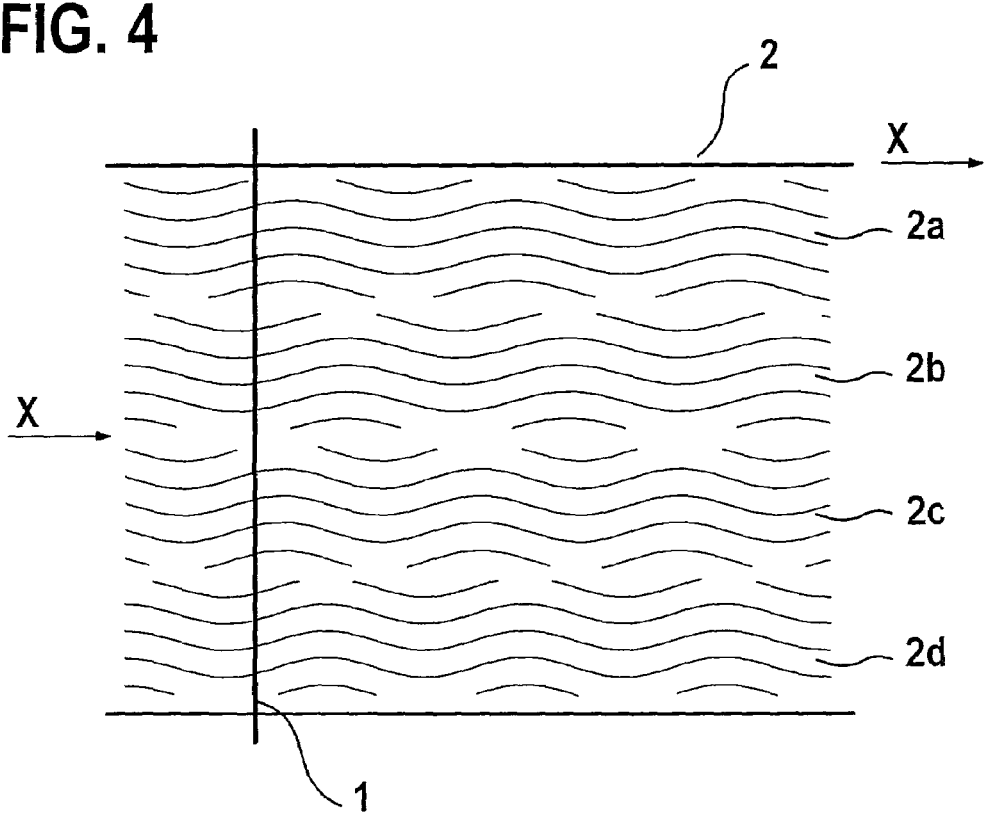
FIG. 4 shows a projected view of another preferred code track for the code ring according to FIG. 1, which can be used to produce a second preferred embodiment of the method according to the invention.
Figure 5:
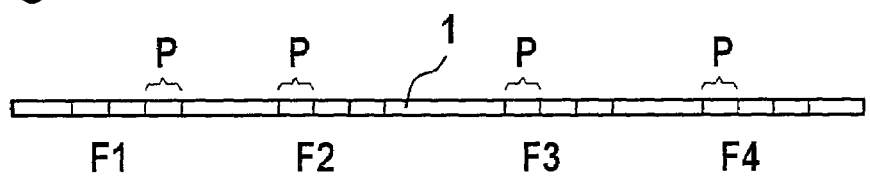
FIG. 5 is a diagram for depicting the phases obtained with a code track according to FIG. 4, perpendicular to the movement direction of the code track.

The views in FIGS. 4 and 5 correspond to those in FIGS. 2 and 3. The CCD line 1 here is likewise disposed perpendicular to the movement direction x of the code track 2. The code track 2 is subdivided into four segments 2a, 2b, 2d, 2c, which once again each have closed, periodic line patterns, for example sine and cosine curves. The periodicities of these patterns are designed so that the two first segments 2a and 2b, which constitute a first line pattern pair, have n periods over the circumference of the code track (360°) and the segments 2c and 2d have m periods, for example n+1 periods.

The line patterns are projected onto the CCD line 1 as periodic structures with known and fixed periods or periodicity, as depicted in FIG. 5. In this case, however, the patterns F1, F2, F3, and F4 are in a phase relationship to an imaginary reference line, i. e. an arbitrary line in the direction of the movement direction x. The phase shifts are possibly also subjected to a constant shift (offset), which can be caused by the installation geometry and by tolerances or play. Since this constant shift is the same in all four segments, it can be calculated in a simple fashion by taking into account the fact that the phase positions F1 and F2 or F3 and F4 must each correspond to the sine and cosine of a common angle.

The further calculation of the overall angle then takes place in a manner analogous to the evaluation that has already been explained in conjunction with the first preferred embodiment of the method according to the invention.

Figure 6:
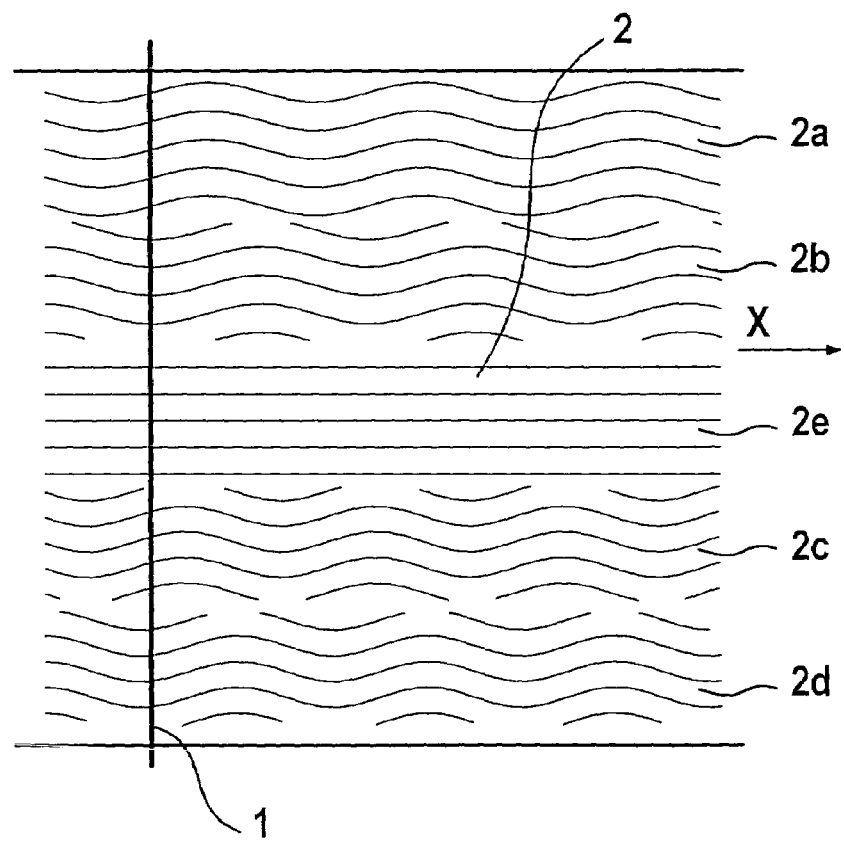
FIG. 6 shows a projected view of another preferred code track for the code ring according to FIG. 1, which can be used to produce a third preferred embodiment of the method according to the invention.
Figure 7:
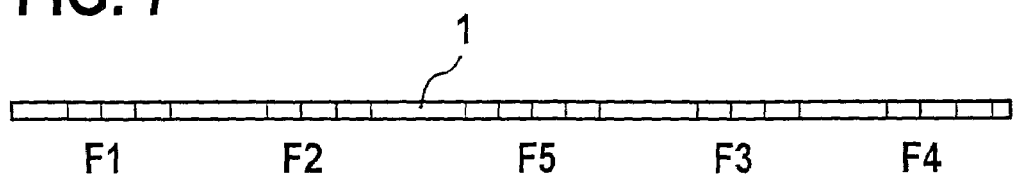
FIG. 7 is a diagram for depicting the phases obtained with a code track according to FIG. 6, perpendicular to the movement direction of the code track.

By contrast with the second preferred exemplary embodiment, in the embodiment of the code track for executing the method according to the invention that is depicted in FIGS. 6 and 7, in addition to the line patterns 2a to 2d, a middle segment of the code track is provided with an additional line pattern 2e, which has straight-lined, constant line pattern as a reference. The use of such a reference pattern produced explicitly on the code track turns out to be advantageous in the computational evaluation of the phase positions F1 to F4. For example, a constant shift, which is caused by the installation geometry or tolerances, can be determined directly on the basis of the fifth line pattern 2e since the straight lines are shifted by precisely this amount of the constant shift.

The invention claimed is:

1. A method for optical measuring data acquisition of a component that moves in a rotatory or translatory manner, comprising the following steps:
generation of a first pair of periodic line patterns (2a, 2b) extending in the movement direction of the component and each having n periods over the movement range of the moving component, wherein the line patterns are disposed in a fixed phase relationship to one another in the movement direction of the component (2a, 2b), generation of a second pair of periodic line patterns (2c, 2d) extending in the movement direction of the component, which each have m periods, over the movement range of the moving component, wherein the line patterns are disposed in a fixed phase relationship to one another in the movement direction of the component (2c, 2d), determination of respective periodicities and phases (P1, P2; F1, F2) of the line patterns of the first pair (2a, 2b), determination of respective periodicities and phases (P3, P4; F3, F4) of the line patterns of the second pair (2c, 2d) in relation to a reference value perpendicular to the movement direction of the component, determination of the phase position (PH1) of the first pair of line patterns (2a, 2b) (on the basis of the periodicities and phases (P1, P2; F1, F2), determination of the phase position (PH2) of the second pair of line patterns on the basis of the periodicities and phases (P3, P4; F3, F4), and determination of the position of the component on the basis of the phase positions (PH1, PH2).

2. The method according to claim 1, characterized in that the line patterns (2a, 2b; 2c, 2d) each include at least one sine curve and one cosine curve.

3. The method according to claim 2, wherein the line patterns (2a, 2b; 2c, 2d) each include a number of sine curves and co-sine curves each with said period length and different amplitudes.

4. The method according to claims 1, characterized in the the phase positions (PH1, PH2) are calculated in accordance with equations in the form:

$$PH1 = \arctan(P1/P2) \text{ or } \arctan F1/F2, \text{ and}$$

$$PH2 = \arctan(P3/P4) \text{ or } \arctan F3/F4.$$

5. The method according claim 1, characterized in that a rotation angle of a shaft (4) is determined on the basis of the phase positions (PH1, PH2) through the use of the vernier principle.

6. The method according to claim 1, characterized in that the periodicities or phases (P1, P2, P3, P4) of the line patterns perpendicular to the rotation direction of a shaft are determined by means of periodically changing distances between individual lines of the respective line patterns (2a, 2b, 2c, 2d).

7. The method according to claim 6, characterized in that adjacent lines of the individual line patterns (2a, 2b, 2c, 2d) are always spaced the same distances apart from one another on an intersecting line perpendicular to the rotation direction of the shaft.

8. The method according to claim 1, characterized in that the phases (F1, F2, F3, F4) of the line patterns perpendicular to the rotation direction of a shaft (4) are determined by means of changing distances of lines of the line patterns in relation to a real or imaginary reference line or reference line pattern (2e) extending in a straight line in the rotation direction, wherein the individual lines of the line patterns always have constant distances to one another in the movement direction of the component.

9. The method according to claim 1, wherein the generation of the first pair of periodic line patterns (2a, 2b) includes generation of the first pair of periodic line patterns (2a, 2b) extending in the movement direction of the component and each having n periods over the measurement range of the moving component selected from the group consisting of a definable distance and an angular range of 360°.

10. A device for optical measuring data acquisition of a component (4) that moves in a rotatory or translatory manner in accordance with the method according to claim 1, with a code track (2) that is applicable to the moving component and includes at least two pairs of periodic line patterns (2a, 2b, 2c, 2d), a sensor (1) for optical detection of the line patterns, and a computing unit (5) for calculating a position of the component (4) on the basis of the line patterns detected by the sensor (1) and for calculating periodicities and phases derived from these line patterns.

11. A code ring for use in a method for optical measuring data acquisition of a component that moves in a rotary or translatory manner, characterized by means of at least two pairs of periodic line patterns (2a, 2b, 2c, 2d), wherein a first pair has n periods over the circumference of the code ring and the second pair has m periods over the circumference of the code ring, and the line patterns of the respective pairs are disposed in a fixed phase relationship to one another.

* * * * *